United States Patent [19]
Heaney

[11] Patent Number: 5,542,204
[45] Date of Patent: Aug. 6, 1996

[54] FLY-FISHING LINE HOLDING DEVICE

[76] Inventor: William H. Heaney, 468 Cambridge Rd., Ridgewood, N.J. 07450

[21] Appl. No.: 305,155

[22] Filed: Sep. 13, 1994

[51] Int. Cl.⁶ .................................................. A01K 97/00
[52] U.S. Cl. ........................................................ 43/4; 43/1
[58] Field of Search ...................... 43/4, 4.5, 1; 15/215, 15/217, 161, 186; 114/229

[56] References Cited

U.S. PATENT DOCUMENTS

| 227,115 | 5/1880 | Lawrence | 15/217 |
| 378,369 | 2/1888 | Hyer | 15/215 |
| 1,526,267 | 2/1925 | Dessau | 15/215 |
| 3,783,471 | 1/1974 | McGeary et al. | 15/215 |

FOREIGN PATENT DOCUMENTS 421835  1/1935  United Kingdom .................... 15/215

Primary Examiner—Jack W. Lavinder
Assistant Examiner—Jay A. Stelacone
Attorney, Agent, or Firm—Notaro & Michalos

[57] ABSTRACT

A device for at least partly immobilizing fly line includes a mat that forms a substrate and a plurality of curved nylon prongs extending upwardly from the substrate. The prongs are spaced from each other over an area of the substrate. Fly line can be pulled from a reel and allowed to randomly fall in coils in and among the spaced prongs. This prevents the fly line from moving due to transverse wind so that it can easily be cast or "shot", or the line can be released to a hooked fish, without tangling, knotting or breaking.

8 Claims, 1 Drawing Sheet

FLY-FISHING LINE HOLDING DEVICE

FIELD AND BACKGROUND OF THE INVENTION

The present invention relates, in general, to fly-fishing, and in particular, to a new and useful device which helps facilitate the relatively new sport of salt water fly-fishing.

The term fly-fishing is applied to a type of fishing which utilizes lures which simulate light winged insects (i.e. flies) and other aquatic creatures, minnows, frogs, crayfish and worms, for example. The lures are cast onto the surface of the water in the hopes that a fish, seeing the lure, will think it to be a natural insect or food item which has landed or dropped onto the water's surface, and strike it.

Unlike other forms of fishing which utilize the casting of bait or lures from a reel or coil of fishing line, the fly-fisherman releases a significant length of fly-fishing line from his or her reel, and allows the line to accumulate on the ground, or on the surface of the water if the fisherman is wading in the water. Also, unlike other forms of cast fishing where the reel is mounted forward of a handle area on the rod, the reel on a fly rod is mounted near the lower end of the rod, with the handle forward of the reel. To cast the fly, the fisherman swings the rod in an oscillating motion, causing the fly line to loop overhead while feeding the line into the overhead loop. The fisherman then tries to accurately lay the fly and its length of line, at a selected location on the water's surface.

When confined to lakes and streams, no special measures are usually needed to control the fly line which is allowed to accumulate on the ground or water surface in preparation for a cast.

A relatively new field has evolved, however, which utilizes fly fishing techniques in a salt water environment. Fishing is conducted off the deck of the boat, or ship, and is subject to the extremes of ocean wind and weather.

On shipboard, a strong wind can cause the coils of fly line accumulated on the deck to blow around the boat, and thereby cause it to knot, tangle or break. The fly line can also be caught on machinery, ropes, cleats and other equipment and even under the fisherman's shoes, making it impossible to cast.

The inventor has heard of the use of a tub containing truncated cones, into which the coils of fly line are deposited after they are pulled from the reel of the fly rod. This does not completely solve the problem since under heavy winds the tub itself can be blown around or even blown over on the deck. This is due to the relatively high vertical walls of the tub which are upright against the force of the wind. In addition, if the fisherman moves around the boat, the fly line must then extend at an angle over the lip of the tub. This has been found to adversely interfere with a quick deployment of the fly line. When the fly is being cast, it is necessary that the coiled fly line quickly and easily follow the loops of fly line behind the fly.

Various devices are known for holding or accumulating fishing line of different types, although not for use in the field of fly fishing.

U.S. Pat. No. 2,469,037 to Harvey discloses a portable fisherman's barrel knot tier comprising a base piece having two strand gripping supports and a strand holding member located therebetween and extending from the base. The device is used to tie strands of fishing line by gripping, holding and twisting the line.

U.S. Pat. No. 4,525,949 to Pike et al. discloses a trotline storing and dispensing arrangement comprising a rotatable receptacle which is a circular tray arrangement having a plurality of compartments arranged around the outer circumference of the tray. A side-wall which is inwardly spaced in a circumferential arrangement from the outer periphery of the tray has a plurality of notches cut therein for receiving a series of leaders leading from each outer compartment.

U.S. Pat. No. 5,291,681 to Bjornson et al. teaches a means for handling a long line on a fishing vessel comprising a U-shaped yoke extending from a support which also holds a rod. A main line extends from the rod and is coiled around the yoke. A plurality of branch lines are connected to the coils and the rod.

U.S. Pat. No. 4,899,481 to Burton et al. discloses an automatic long line commercial fishing apparatus comprising a tub for holding a main fishing line and the branch lines of the fishing lines.

A need remains for a simple yet effective mechanism for partly immobilizing fly line which has necessarily been accumulated on a surface in preparation for casting a fly, while allowing the line to be deployed in the simplest and smoothest manner possible.

SUMMARY OF THE INVENTION

An object of the present invention is to provide an exceedingly simple and elegant device which effectively immobilizes a fly line from lateral movement along a surface, in preparation for casting of the fly line and fly.

A further object of the present invention is to provide such a device which is adapted primarily to offshore fly rod fishing. Although the present invention is adapted primarily to salt water fly-fishing off a boat or ship, the invention can also be utilized in fresh water, for example, large fresh water lakes, or even for conventional lake or stream fly rod fishing in windy areas.

According to the present invention, the device comprises a substrate and a plurality of horizontally spaced, upstanding flexible prongs, extending upwardly from the substrate. The line is allowed to fall in uncontrolled coils among the prongs and is automatically held in place against the wind, which is incapable of totally dislodging the fly line. Due to the flexible nature of the prongs, when a casting operation is begun, the fly line can flow easily from the device. The prongs bend out of the way of the coils of fly line. Even when the fly line is being pulled laterally at an angle to the substrate, the flexibility of the prongs allows the line to return to the fly rod, and be cast.

Another object of the present invention is to provide a device for at least partly immobilizing a fly line on a surface which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
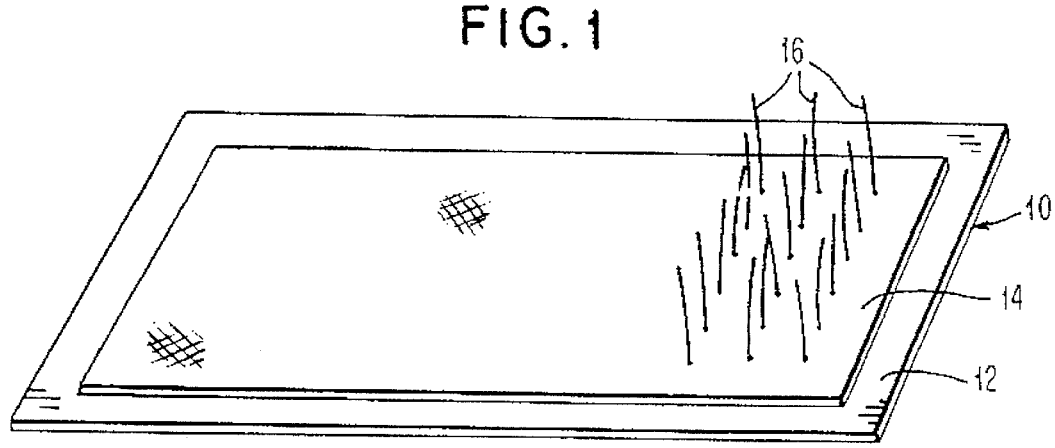
FIG. 1 is a perspective view illustrating one embodiment of the present invention.

Referring to the drawings in particular, the invention embodied in FIG. 1 comprises a device for at least partly immobilizing fly line on a surface, which comprises a substrate, generally designated 10, which is advantageously in the form of a rubber doormat having a lower natural or synthetic rubber layer 12 which is at least partly covered by woven or non-woven rug material 14.

In accordance with the present invention, an area of the substrate, advantageously at one end of the substrate, includes a plurality of horizontally spaced, upstanding flexible prongs 16. Although the prongs can be arranged in any random or regular pattern desired, it is preferred that at least multiple rows each containing multiple prongs is utilized, and spaced about a selected area of the mat, for example, ¼ of the total area of the mat, depending on wind conditions expected and the type of boat (stiff, flat boats, whaler, etc.) to be used.

Figure 2:
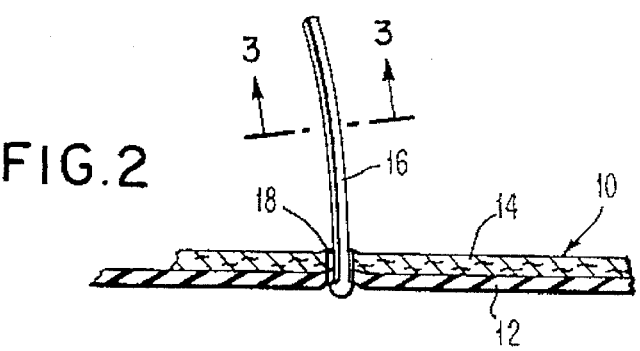
FIG. 2 is a cross-sectional view of one prong and an area of substrate used in accordance with the present invention.

As best shown in FIG. 2, each prong 16 is maintained in its upstanding position with respect to the mat 10, by extending through a hole or opening 18 in the mat. Prongs 16 are advantageously made of nylon or semi-rigid yet flexible waterproof and durable material. The type of heavy nylon line used in rotary weed cutting devices is ideal. To anchor the prongs to the mat in the simplest possible way, hole 18 is made to be slightly smaller than the cross-sectional dimensions of prongs 16, and the lower end of prongs 16 is enlarged at 20, for example, by heating and fusing a short section of the prong. Prong 16 may or may not be permanently attached to the mat. Because of the rubber lower layer 12 of the mat, the prong 16 is held firmly in place even if no adhesive is utilized.

Figure 3:
FIG. 3 is a cross-sectional view of the prong taken in along line 3—3 of FIG. 2.

FIG. 3 shows one example of the cross-sectional shape of prongs 16 which is square and approximately 2 mm on a side. Thicker or thinner prong material can be used and any cross-sectional shape is advantageous, including circular, oblong, triangular, etc.

The prongs 16 are advantageously about 10 cm long but can be shorter or longer and still achieve the purpose of the present invention.

A preferred range of spacing between the prongs on the substrate 10 is about 1 to 20 cm with the prongs having a diameter or cross-sectional dimension of from about 0.5 to 3.0 mm. The prongs are also advantageously about 1 to 200 cm long.

Figure 4:
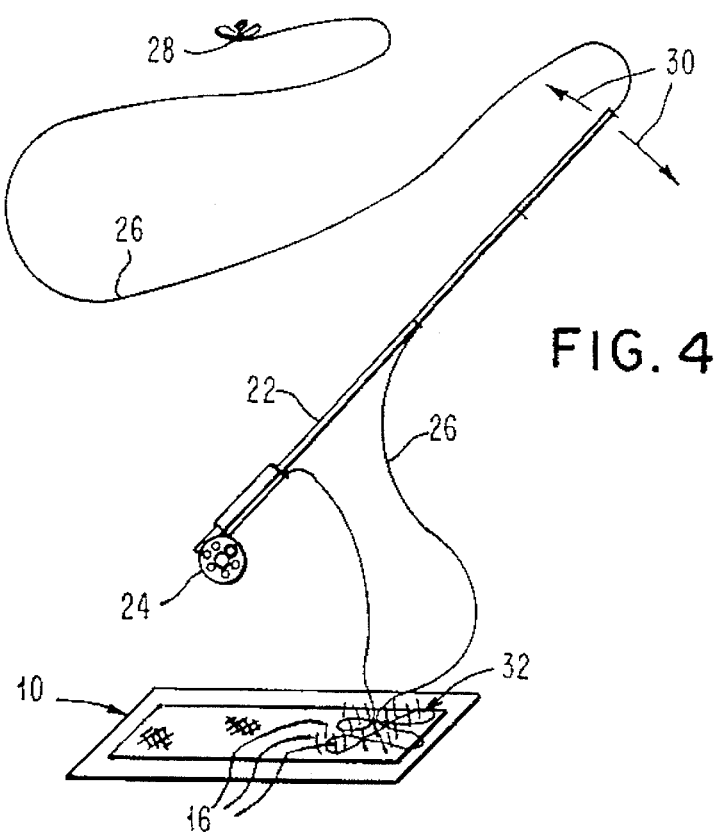
FIG. 4 is a schematic illustration of a fly rod, reel and fly line assembly, used in conjunction with the present invention.

The length, diameter and spacing of the prongs is selected so that a sufficient amount of fly line can be dropped onto the prong containing area of the mat as illustrated in FIG. 4 in the general vicinity of a fisherman carrying a fly rod 22 with a conventionally mounted reel 24, at the lower end of the rod. Fly line 26 is pulled from reel 24 and allowed to drop, coil and accumulate in an among the spaces between prongs 16 at the end of substrate 10. In order to cast a fly, shown for example at 28, at the end of fly line 26, the rod 22 is smoothly oscillated back and forth in the direction of double arrow 30, to form large loops of fly line which move forward and back over the surface of the water and then back over the surface of the boat, when fly-fishing from a boat. The loops are made larger and larger as the fly line is withdrawn from the pile of line 32 which is accumulated among the prongs 16. The flexibility and spacing of the prongs allows the fly line to be easily removed from the pile without binding, tangling or knotting even when large amounts of line are "shot" through the rod 22 guides. Even if the fisherman were to move away from the vicinity of the mat or substrate 10, and even with the fly line being pulled at an angle of the substrate, the flexibility of the prongs allows the fly line to be easily drawn.

The very low profile of substrate 10, in the form of a floor mat, and its high friction lower surface, virtually precludes movement of the substrate, even in high winds. The prongs, while being flexible, still retain and at least partly immobilize the pile of fly line 32, and prevent it from being moved around the deck or other surface on which substrate 10 is used.

Though nylon material forming prongs 16 is generally supplied coiled, and is cut to length from the coil. This leaves a curve in each of the prongs which further advances the object of the present invention. The prongs are mounted to the substrate as shown in FIG. 1, so that the curves of the prongs are randomly situated. The prongs can bend to the front, sides, rear or any random angle. This further helps immobilize the fly line, in any wind direction across the surface of the substrate.

Flexible rubber substrate and rug material conform easily to the variable surface of about without damaging the finish, are heavy enough to resist wind and accidental dislocation. Rug material is also easy on anglers feet.

While a specific embodiment of the invention has been shown and described in detail to illustrate the application of the principles of the invention, it will be understood that the invention may be embodied otherwise without departing from such principles.

What is claimed is:

1. A mat device for at least partly immobilizing a fly line on a surface of the mat device, in combination with the fly line, comprising:

a substrate;

a plurality of horizontally spaced, upstanding flexible prongs, extending upwardly from the substrate so that, fly line deposited randomly onto the substrate and among the plurality of prongs is at least partly immobilized against lateral movement across the substrate due to wind, the fly line being easily removed from among the prongs; and a fly line deposited randomly onto the substrate and among the prongs.

2. A device according to claim 1, wherein the substrate has an area, the prongs covering less than one half the area.

3. A device according to claim 1, wherein the prongs are spaced from each other by an amount of about 1 to 20 centimeters.

4. A device according to claim 3, wherein each prong is from 1 to 20 cm long.

5. A device according to claim 4, wherein each prong is curved.

6. A device according to claim 5, wherein each prong has an enlarged end trapped in the substrate.

7. A device according to claim 6, wherein the substrate includes a plurality of holes, each prong extending through a respective hole.

8. A device according to claim 7, wherein the substrate comprises a lower layer having a high friction lower surface, the lower layer being covered at least partly by a rug-like layer.

\* \* \* \* \*